(12) United States Patent
Hull

(10) Patent No.: US 9,988,123 B2
(45) Date of Patent: Jun. 5, 2018

(54) SUSPENSION AND STEERING ASSEMBLY

(71) Applicant: Loni Hull, Calgary (CA)

(72) Inventor: Loni Hull, Calgary (CA)

(\*) Notice: Subject to any disclaimer, the term of this patent is extended or adjusted under 35 U.S.C. 154(b) by 339 days.

(21) Appl. No.: 14/642,036

(22) Filed: Mar. 9, 2015

(65) Prior Publication Data

US 2015/0307153 A1 Oct. 29, 2015

(51) Int. Cl.
*B62K 21/20* (2006.01)
*B62K 21/22* (2006.01)
*B62K 21/08* (2006.01)
*B62K 25/24* (2006.01)

(52) U.S. Cl.
CPC ............. *B62K 21/22* (2013.01); *B62K 21/08* (2013.01); *B62K 21/20* (2013.01); *B62K 25/24* (2013.01)

(58) Field of Classification Search
CPC ........ B62K 11/14; B62K 21/20; B62K 21/22; B62K 21/02; B62K 25/16
USPC .................................................. 280/276, 277
See application file for complete search history.

(56) References Cited

U.S. PATENT DOCUMENTS

| 4,179,135 | A | \* | 12/1979 | Slater | B62K 25/24 280/276 |
| 4,627,632 | A | \* | 12/1986 | McKagen | B62K 25/24 180/219 |
| 4,834,412 | A | | 5/1989 | Trema | |
| 5,042,609 | A | \* | 8/1991 | Krispler | B62K 25/005 180/219 |
| 5,069,467 | A | \* | 12/1991 | Claudio | B62K 25/24 280/276 |
| 6,517,095 | B1 | \* | 2/2003 | Lansac | B62K 25/24 280/276 |
| 7,806,217 | B2 | \* | 10/2010 | Hasegawa | B62K 21/005 180/219 |
| 8,162,342 | B2 | | 4/2012 | Chen | |
| 8,851,221 | B2 | \* | 10/2014 | Glover | B62J 25/00 180/219 |

FOREIGN PATENT DOCUMENTS

| GB | 1274441 | \* | 5/1972 | ............. B62K 11/04 |
| GB | 2021498 | \* | 12/1979 | ............. B62K 25/04 |
| JP | 4-169386 | \* | 6/1992 | ............. B62K 25/24 |
| WO | 2007/131590 | \* | 11/2007 | ............. B62K 24/24 |

\* cited by examiner

*Primary Examiner* — Anne Marie M Boehler

(57) ABSTRACT

A suspension and steering assembly is provided for a vehicle. The assembly comprises a steering means mounted on a vehicle frame; a steering mechanism comprising an upper link connected to the steering means; and a steering stem having a top section connected to a lower link of the steering mechanism; a steering tube having an upper and a lower portion; an upper control arm having a first extremity connected to a middle section of the frame, and a second extremity connected to the upper portion of the steering tube; a lower control arm having a first extremity connected to a lower section of the frame, and a second extremity connected to the lower portion of the steering tube; the steering stem mounted inside the steering tube; and a wheel fork having a lower section for receiving a wheel of the vehicle and an upper section connected to the steering stem.

8 Claims, 4 Drawing Sheets

SUSPENSION AND STEERING ASSEMBLY

FIELD OF THE INVENTION

This disclosure relates to a suspension and steering assembly for a vehicle such as a motorcycle or a bicycle.

BACKGROUND OF THE INVENTION

Various suspension assemblies for vehicles such as motorcycles and bicycles have been proposed. These suspension assemblies may or may not be associated with the steering mechanism of the vehicle. Many of the suspension systems include telescoping forks such as those typically observed on the modern motorcycle. Some of these systems display high friction at the point of sliding seals, and hence, require frequent maintenance and/or replacement. Moreover, there are challenges involved in maintaining a smooth ride on these vehicles when travelling over undulating surfaces. Telescoping forks tend to be large and heavy, making maneuverability difficult. The suspension and expansion of the telescoping forks may not always be suitable for absorbing the forces against the wheel, for example. As the telescoping forks compress, the steering and braking ability of the vehicle is generally adversely affected. Depending on the geometry of the vehicle, the angled fork formed by the telescoping arms moves the front tire upward and backward when the arms are compressed, thus shortening the distance between the front and back wheels. This in turn results in a more uneven ride.

Many of the proposed suspension assemblies are not ideal for bicycles. Because telescoping forks are generally large, a large frame and a large steering head are needed to accommodate the forks. This creates strain on the operator attempting to operate the large steering head and fork assembly. The forces acting on the forks are transmitted to the operator's body. Operators who continually operate vehicles having a telescoping fork assembly often complain about arm pain and fatigue.

In many prior art disclosures, the steering links have pivotal connections at the ends proximal to the frame, but no prior art describes a needle bearing within a rod end as the means of doing so. Nowhere in the prior art is there a damper between upper and lower steering links as means to convey vibration and impact from the tire contact patch to the operator's hands.

The present invention overcomes many of the drawbacks from the prior art devices by providing a lightweight suspension and steering assembly for use on 2 wheel vehicles.

SUMMARY OF THE INVENTION

The present invention relates to a suspension and steering assembly that is particularly useful for 2-wheel vehicles such as bicycles.

According to one aspect of the present invention, there is provided a suspension and steering assembly mounted on a frame of a vehicle having a front wheel, said assembly comprising:
  a steering means, said steering means being rotatably mounted on an upper portion of the frame;
  a collapsible steering mechanism comprising:
    an upper link having a top and bottom extremity; and
    a lower link having a top and bottom extremity;
  said top extremity of the upper link being hingedly connected to the steering means and the bottom extremity being hingedly connected to the top extremity of the lower link of the collapsible steering mechanism; and
  a steering stem having a top and a bottom section, said top section being hingedly connected to the bottom extremity of the lower link of the collapsible steering mechanism;
  a steering tube, said steering tube having an upper and a lower portion;
  an upper control arm, said upper control arm having a first and second extremity, said first extremity being pivotally connected to a middle section of the frame, and said second extremity being pivotally connected to the upper portion of the steering tube;
  a lower control arm, said lower control arm having a first and second extremity, said first extremity being pivotally connected to a lower section of the frame, and said second extremity being pivotally connected to the lower portion of the steering tube;
  said steering stem being mounted inside the steering tube and being rotatable about a longitudinal axis defined by the steering tube; and
  a wheel fork having a lower section adapted to receive a wheel and an upper section connected to the bottom section of the steering stem.

Preferably, the suspension and steering assembly further comprises a damper comprising an upper end and a lower end, said damper being positioned between the upper link and the lower link of the collapsible steering mechanism. Preferably, the damper is coupled at its upper end to the upper link and at its lower end to the lower link.

Preferably, the steering means comprises: a handlebar or other steering control; and a steering head.

Preferably, the collapsible steering mechanism is pivotally linked to the steering stem to which the handlebar is attached.

Preferably, the wheel steering assembly includes a steering tube.

Preferably, the steering stem rotates within the steer tube by means of bearings.

Preferably, the pivotal couplings of the upper and lower control arms comprise bearings allowing for pivoting about a horizontal axis only.

Preferably, the ratio of the length of the upper or lower arms relative to the total length of the vehicle is as much as 40%.

Preferably, the suspension and steering assembly comprises a rod end and needle bearing hingedly connecting the upper link to the lower link of the collapsible steering mechanism.

Another object of the present invention is directed to a collapsible steering mechanism for use in a suspension and steering assembly on a vehicle having a front wheel, said collapsible steering mechanism comprising:
  an upper link having a top and bottom extremity;
  a lower link having a top and bottom extremity;
  a rod end and needle bearing hingedly connecting the bottom extremity of the upper link with the top extremity of the lower link; said top extremity of the upper link being adapted to being hingedly connected to a steering means on the vehicle and the bottom extremity being hingedly connected to the top extremity of the lower link, the bottom extremity of the lower link being adapted to be hingedly connected to a steering stem located on the vehicle.

Preferably, the collapsible steering mechanism further comprises a damper comprising an upper end and a lower end, said damper being positioned between the upper link and the lower link of the collapsible steering mechanism. Preferably, the damper is coupled at its upper end to the upper link and at its lower end to the lower link.

DETAILED DESCRIPTION

Figure 1:
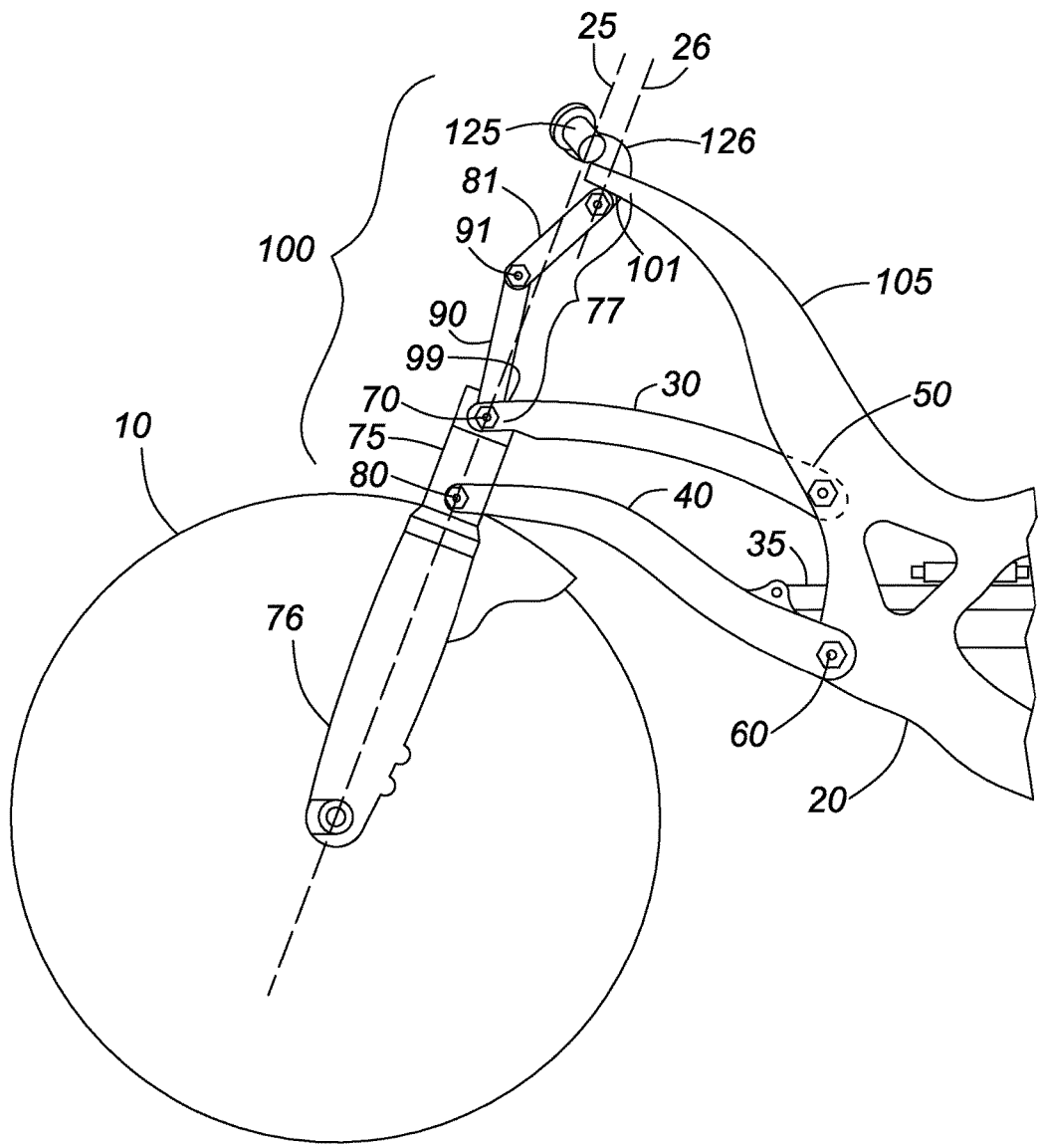
FIG. 1 is a side view of the suspension and steering assembly according to one embodiment.

Generally, there are three functions of a front suspension system of a bicycle or motorcycle: 1) to carry the weight of the front end of the vehicle; 2) to provide for steering of the vehicle; and 3) to allow for suspension travel (i.e. upward and downward movement of the front wheel in order to cope with travel along uneven surfaces).

There are certain advantages that come with separating the functions of steering, suspension and braking in a vehicle. This is particularly true for two-wheeled vehicles such as bicycles, motocross bikes and motorcycles. For example, telescoping forks are often used as part of the suspension assembly of two-wheel vehicles, and these telescoping forks are also part of the steering and braking assembly. Thus, as these forks compress, the steering and braking ability is impacted. The distance between the front and rear wheels is shortened because the front wheel is moved backward when the forks are compressed. This creates an uneven ride. The coupling of the trailing arms to a steer tube which is, in turn, coupled by industry-standard steering head bearings to a rigid fork has not been taught in prior art. U.S. Pat. No. 8,162,342 discloses the use of a steer tube coupled via bearings to a rigid fork.

U.S. Pat. No. 4,834,412 discloses a motorcycle front wheel suspension device where control arms connected to the frame are connected directly to the wheel fork as well as the suspension device connects the wheel fork directly to the handlebars/frame referred to as the peak of the motorcycle chassis.

Telescoping forks tend to be large and heavy, and accordingly, the frame of the vehicle also has to be large and strong to accommodate the suspension system, including the telescoping arms. Larger vehicles are generally more difficult to handle, requiring greater steering forces. Also, the force on the telescoping forks during compression and expansion is transmitted into the frame and handlebars, and thus, to the operator's body. Ideally, the suspension and steering assembly is of low weight and small size, and has the ability to absorb and/or minimize the forces acting on the vehicle so as to assist with the comfort of the operator during the ride.

It would be useful to have a suspension system that is light-weight and which minimizes the forces transmitted to the vehicle operator.

According to the present invention, suspension springing and damping functions are separate from braking forces acting upon the front wheel during application of the front brake caliper. Although the control lever for the braking system is handlebar-mounted, braking forces acting upon the wheel are completely isolated from the handlebars and can be almost completely prevented from exerting an effect upon the control arms, damper, and spring. This cannot be said for telescoping forks, which experience dive and significant forward weight transfer of rider and frame during application of the brakes.

The suspension system according to the present invention allows for the vehicle to be designed such that the center of mass can be lowered and centralized. Because so much mass has to be concentrated at the steering head in order for the frame to cope with the weight of and impacts to telescoping forks—which themselves can account for as much or more weight than the main frame itself—there is only so much mass that can be removed from the steering head or telescoping forks before the vehicle becomes unsafe or damage-prone, so the weight of a modern bicycle with telescoping forks will always be centered high and forward. The present invention allows for a very lightweight and slender steering head on the main frame, lightweight forks and steer tube, a shock/spring assembly located within the center of the main frame (a significant design advantage, but not unobvious due to existent public-domain motorcycle designs), and reinforcement of the main frame and front trailing arms in areas which are low and centered relative to the assembled bicycle with rider. No bicycle with telescoping forks can ever achieve a similar distribution of mass; it is an inherent limitation of telescoping forks that they are heavy and create a bicycle with forward weight bias.

While the present suspension system is primarily useful for vehicles such as bicycles, motor-cross vehicles and motorcycles, it will also be understood that the suspension system can be used in other equipment such as all-terrain vehicles (such as ATVs), power tools and heavy construction equipment.

The present invention will be better understood by referring to the preferred embodiment illustrated in the attached figures. Referring to FIG. 1, a suspension and steering assembly 100 for a vehicle having a single steered wheel 10 is shown. The suspension and steering assembly 100 is suitable for a 2-wheel vehicle, such as a bicycle or motorcycle. The vehicle has a main frame or chassis 20, as better seen in FIG. 2. The suspension and steering assembly 100 is coupled to chassis 20 by upper control arm 30 and lower control arm 40. Upper control arm 30 and lower control arm 40 are pivotally coupled to chassis 20 at upper pivotal coupling 50 and lower pivotal coupling 60, respectively. The upper control arm 30 and lower control arm 40 are also pivotally coupled to wheel steer tube 75 of the vehicle at pivotal couplings 70 and 80, respectively. Pivotal couplings 70 and 80 are formed by two pairs of bearings which allow for pivotal movement of upper 30 and lower 40 control arms about a horizontal axis. Couplings 70 and 80 also allow for pivotal steering movement about a wheel steering axis which passes through bearings within wheel steer tube 75. The wheel steering axis is shown as broken line 25 in FIG. 1. The wheel steering stem (not shown) attached to fork 76 is contained within steer tube 75.

Upper and lower control arms (30 and 40, respectively) are long trailing links, meaning that the distance between the wheel steering axis (shown as broken line 25 in FIG. 1) and the bottom tube of the frame or chassis of the vehicle (shown as 20 in FIG. 1) is 200-300% greater than the distance one typically expects in 2-wheeled vehicles that utilize trailing links. The trailing arms are 200-300% longer than those present in most of the prior art trailing arms.

In most of the prior art, the control arms are less than half the length of those according to an embodiment of the present invention, which are approximately 33% of the length of the assembled frame with forks. When long trailing arms are used, the arc defined by the range of motion of the forward (distal) ends of the trailing arms is closer to linear, resulting in less deviation of the wheel steering axis from the vehicle frame steering head axis throughout the range of suspension travel. Shorter arms make the wheel steer tube push out farther than is desirable from the fixed steering axis of the vehicle frame steering head [at the handlebars]. A larger arc creates a more linear vertical path for the wheel steer axis throughout the range of suspension travel.

In addition, long trailing links allow for a greater range of suspension travel as compared to shorter trailing links or arms. The two trailing link type control arms also allow for greater rigidity of the short, light, front fork than is possible with long telescoping fork tubes. In a conventional telescoping fork, the sliding tubes of the telescoping fork twist and bend laterally and longitudinally during steering, braking, and upon impact with obstacles that compress the suspension. The control arms of the present suspension and steering assembly keep the entire suspension and steering assembly stable.

Torsional effects typically transmitted from telescoping forks to the handlebars are therefore minimized, and steering commands are less adversely affected by obstacles encountered by the front wheel. With telescoping forks, torsional effects caused by an offset impact to the front wheel causes the forks to twist and then rebound, causing fatigue for the rider and a need for steering correction as the wheel becomes momentarily misaligned.

A damper 120 (refer to FIG. 3) may optionally be positioned between upper steering link 81 through a pivotal attachment created by a pin (not shown) inserted through apertures 122 and 124 located in the upper steering link 81 and aperture 116 (refer to FIG. 4) located on a first extremity of the damper 120 and through a pivotal attachment created by a pin (not shown) inserted through apertures 115 and 123 (not shown) located on the lower steering link 90 and aperture 128 located on the damper. By means of an adjustable damper 120, a variable amount of vibration and feedback generated at the tire's contact patch with the ground is transmitted from the front wheel 10 and fork assembly 76 via the wheel steer tube 75, through the lower steering link 90, to the upper steering link 81 via the damper 120 and thus to the operator's hands one complaint levied against trailing link front suspension designs on bicycles and motorcycles is a lack of "feel" (tactile feedback) transmitted from the wheel's contact patch to the rider's hands. The inclusion of an adjustable damper within the confines of the steering assembly will transmit a variable proportion of energy from bump absorption to the rider in an effort to address the above complaint.

Figure 3:
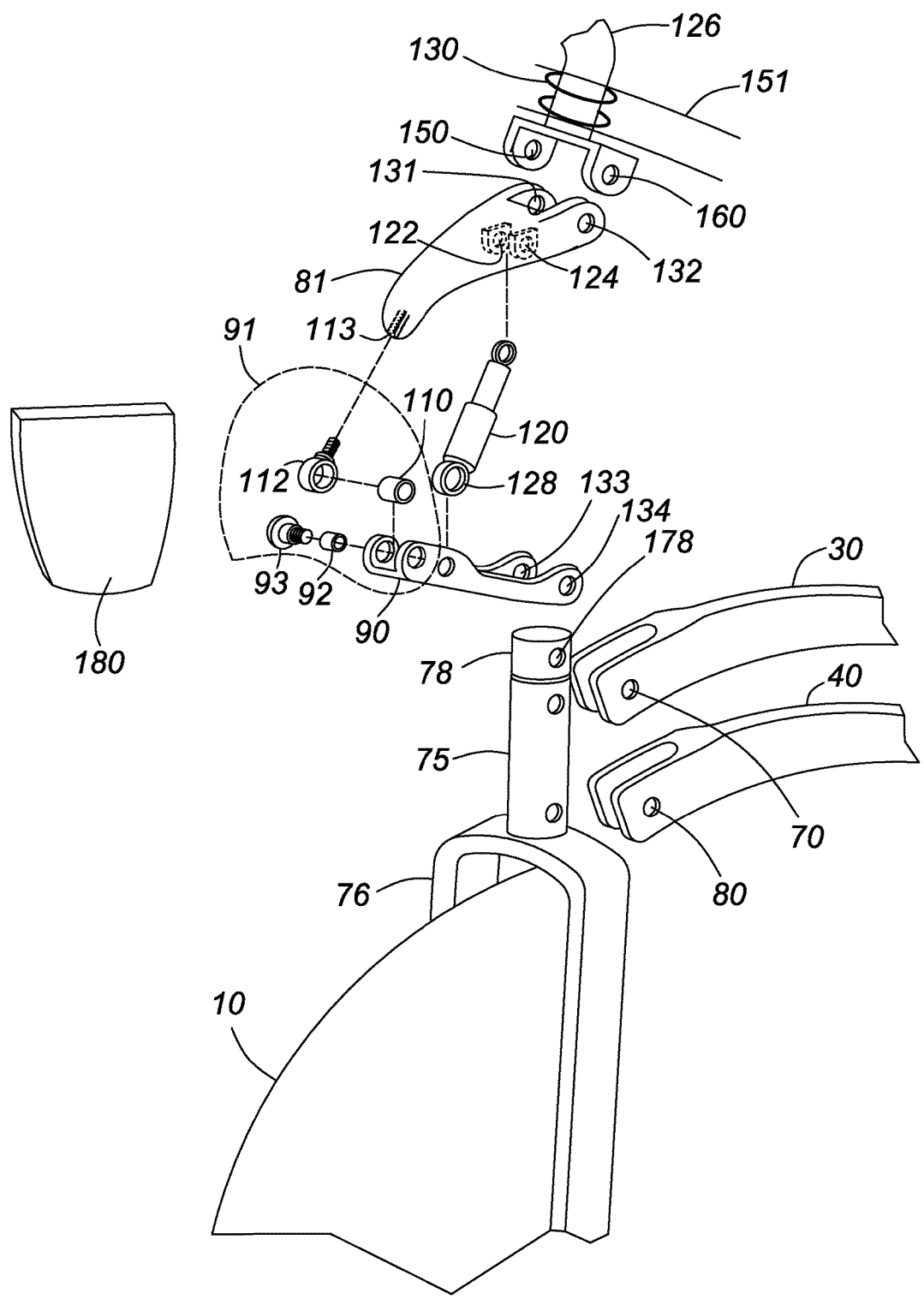
FIG. 3 is an exploded view of the suspension and steering assembly according to one embodiment.

Referring to FIG. 3, upper steering link 81 is coupled to yoke 130. In the illustrated embodiment, upper steering link 81 has two apertures 131 and 132 which align with apertures 150 and 160 of yoke 130. Yoke 130 is coupled to steering head 151. Steering input applied to steering head 151 by the operator of the vehicle is thus transferred to the front wheel 10 of the vehicle by way of rod/needle bearing 91 that pivotally couples upper steering link 81 and lower steering link 90.

Figure 2:
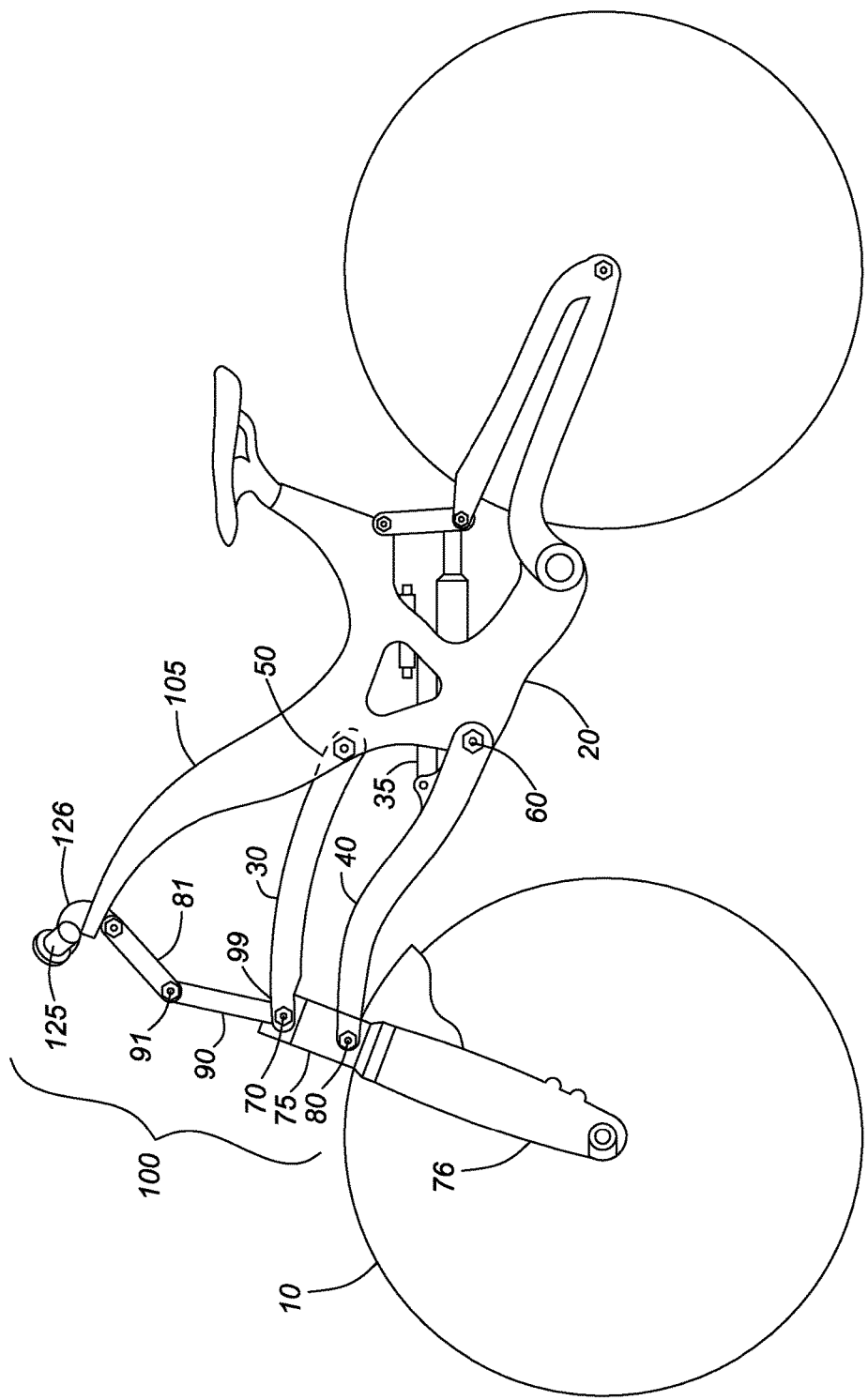
FIG. 2 is a bicycle with the suspension and steering assembly according to one embodiment.

Referring to FIGS. 1 and 2, the suspension and steering assembly 100 includes a collapsible steering mechanism 77. Collapsible steering mechanism 77 includes upper steering link 81 coupled to lower steering link 90 via rod end/needle bearing assembly 91, shown as rod 111 and needle bearing 110 in FIGS. 3 and 4. The needle bearing 110 is inserted into the rod end 112 and secured in place through the use of two screws 93 inserted into a threaded nut 92 through apertures 95 and 97 located at the extremity of the lower steering link 90. The rod 111 is secured in place on the upper steering link 81 through the use of a threaded end 113 located at the lower extremity of the upper steering link 81 and a bolt end 114 located on the rod 111.

The only other known functional substitution to a needle bearing would be a ball joint or rod end, however the rapid movement and wide range of motion of this pivot during expansion and collapse of the steering assembly could potentially accelerate wear of a ball joint or rod end alone. One of the benefits of the incorporation of a needle bearing is that it is an extremely low-friction bearing. The needle bearing allows low-friction expansion and collapse of the shared, distal pivot of the upper and lower steering links while allowing for pitch change between the upper and lower steering links, which pivot at the frame steering head and the fork's steer tube. Both ball joints and rod ends possess less than optimal friction/stiction [initial resistance to movement from a static condition] for such an application, a negative characteristic of some pivot hardware which is often noted by mountain bike riders.

An optional decorative shield 180 may be placed adjacent to or attached to collapsible steering mechanism 77, for example in proximity to lower steering link 90.

Steering Function:

The steering of a vehicle that utilizes the present suspension and steering assembly will be applied in a conventional manner through a handlebar 125. Motion of handlebar 125 is translated into steering motion of front wheel 10 via pivotal couplings 99 and 101.

Pivotal coupling 101 connects upper steering link 81 to the vehicle frame steering head 105. Pivotal coupling 99 connects lower steering link 80 to steer tube 75.

According to an embodiment of the present invention, one could consolidate couplings 150/131 and 160/132 (FIG. 2) into a single pivot instead of two, but this could result in some loss of strength. Further, if any of the pivoted joints were instead rigid it would create binding that would make the system inoperable.

It is noted that in the illustrated embodiment, handlebar 125 is coupled to handlebar stem 126, which in turn is connected to vehicle frame steering head 105 by means of bearings and by pivotal connection to upper steering link 81. Alternative arrangements of the handlebar are possible, and various handlebar shapes are possible. It is also noted that steer tube 75 pivotally attaches to rigid fork 76 via bearings and clamp 78. It is also noted that in the embodiment shown, steer tube 75 is coupled to clamp 78 that is pivotally connected with lower steering link 90 through attachment by a pin (not shown) inserted through apertures 133 and 134 located on the lower steering link 90 and the aperture 178 located on the clamp 78. Alternative arrangements are possible. For example, the pivotal connection points 70 and 80 on wheel steer tube 75 for control arms 30 and 40 need not be aligned with axial centerline 25 (FIG. 1), which bisects wheel steer tube 75. Pivotal connection points 70 and 80 may vary in location on wheel steer tube 75.

As handlebar 125 is connected to chassis 20 of the vehicle via bearings at vehicle frame steering head 105, handlebar 125 may be turned relative to frame 105. This motion is transferred to the front wheel axle through collapsible steering mechanism 77. Suspension movement of upper control arm 30 and lower control arm 40 relative to chassis 20 is accomplished by pivotal couplings 50 and 60 which couple control arms 30 and 40 to chassis 20.

Referring to FIG. 1, the arrangement of the suspension and steering assembly described herein allows the steering of the front wheel throughout a suspension travel path in which the wheel steer axis 25 and the steer axis 26 of the operator's steering control (e.g. wheel or handlebar) are misaligned through a portion of the travel path.

The travel path is defined by the arcs created at the forward end of the control arms. The wheel steer axis (the axis upon which the fork turns through steer tube 75) does not deviate laterally, but because the forward ends of the arms create an arc as they move from the bottom to the top of the suspension range, the wheel steer axis becomes misaligned with the angle of the axis 26 of the vehicle frame's steering head, which never varies.

The suspension and steering assembly provides great stability due to the high rigidity and strength of the carbon fiber control arms and the precision of high quality pivot bearings prevents steering head 75 from deviating laterally, while simultaneously allowing free up and down movement of tire 10, forks 76, and steering head 75. Apart from the steering assembly 77, control arms 30 and 40 and steer tube 75 would hold forks 76 with sufficient strength that the suspension could move up and down with significantly less lateral deviation than occurs in long telescoping fork tubes. The suspension and steering assembly allows for greater constant alignment than telescoping forks because the movement of the fork throughout the suspension range is more steeply vertical [when viewed from the side] than that of a telescoping fork (which slides both upward and significantly backward). The vertical axle paths of both front and rear axles of a vehicle using the suspension and steering assembly according to an embodiment of the present invention can be kept more parallel from the bottom to the top of the suspension range, resulting in a more constant wheelbase and greater stability.

Figure 4:
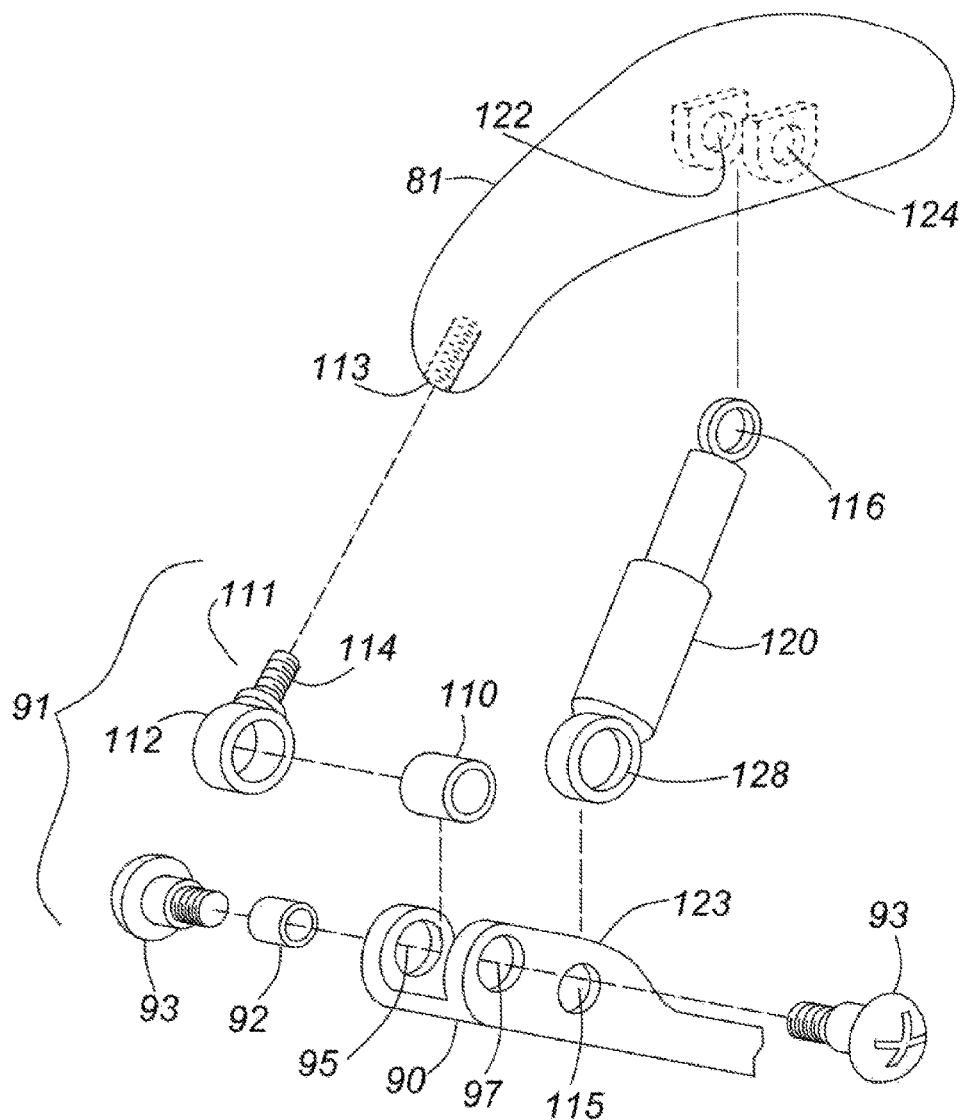
FIG. 4 is an exploded view of the rod end/needle bearing assembly at the pivot between the upper steering link and lower steering link according to one embodiment.

Upper steering link 81 and lower steering link 90 are capable of pitch change in relation to one another by means of rod end/needle bearing 91. If the steering angle increases simultaneously with compression of the suspension, the misalignment created between wheel steering axis 25 and the vehicle frame steer head axis 26 induces a pitch change of the upper steering link 81 and lower steering link 90 in relation to one another. This low-speed misalignment is mitigated by rod end/needle bearing assembly 91 (FIGS. 3 and 4). The needle/roller bearing contained within the opening of the rod end facilitates low-friction collapse and expansion of the upper and lower steering links in relation to one another pivotally.

Thus, the present steering assembly allows for low-speed pitch change of the steering links in relation to one another while simultaneously allowing for low-friction high-speed collapse and expansion of steering assembly 77.

The suspension and steering assembly of the present invention also achieves several other features: the geometry of the system limits the effects of braking forces on damper/spring 35 (FIGS. 1 and 2) With telescoping forks, if a rider applies the front brakes briskly, the bicycle and rider pitch forward and the front forks compress quite a bit, making the front suspension short, rigid and incompliant if a big bump comes along.

With the suspension and steering assembly of the present invention, the location of the brake caliper in relation to the front axle can be chosen in such a way that hard braking creates a cantilever effect between the pinch location of the caliper on the front brake rotor (several inches away from the wheel axle) and the axle, which helps pull the front fork down in relation to the vehicle frame under application of the brakes.

Because spring and damper 35 are mounted to the lower control arm and frame, instead of inside of the fork legs, and because the bicycle does not squat heavily with application of the brakes, there is sufficient range of motion left for the control arms, spring and damper to react to large bumps even under heavy application of the brakes.

Additionally, the axle path of the steered wheel is better controlled, i.e. the axle path is the path the wheel axle travels as the suspension ranges from fully decompressed to fully compressed. The suspension and steering assembly allows for better control compared to the telescoping arms because telescoping forks slide upward and significantly backward as they compress, the wheelbase is shortened greatly when the suspension is fully compressed. Because the front axle path of the suspension and steering assembly of the present invention is more vertical, it is possible to keep the front axle path nearly parallel with the rear axle path (also fairly vertical) through the full suspension range, maintaining wheelbase length and making the bicycle more stable on hard landings. The front and rear axle paths can more effectively be designed to remain in parallel as precisely as possible in order to maintain wheelbase length throughout the full range of suspension movement, which improves vehicle stability.

The suspension and steering assembly of the present invention also retains directional stability while cornering under heavy braking. A conventional telescoping fork may lock during strong braking manoeuvres. The present suspension and steering assembly retains sufficient spring travel when braking, as a result of separation of suspension components from the fork assembly. Therefore, an operator can brake later into a corner than on a bicycle equipped with telescoping forks, particularly over a series of sharp bumps, while maintaining directional stability.

EXAMPLES

FIG. 2 is an example of a bicycle where the suspension and steering assembly described herein may be used. In this example, lower control arm 40 is about 35 cm from pivot point 80 to pivot point 60. Upper control arm 30 is about 29 cm from pivot point 70 on wheel steer tube to the pivot point 50. The distance between the mid-point of each wheel is about 116 cm. The distance between couplings 101 and 99 on suspension and steering assembly mechanism 76 is about 26 cm. In various embodiments of the invention, the control arms may be any length between 10 cm and 200 cm.

For the purposes of the suspension and steering assembly described herein, the control arms may be any length from 10 cm to 200 cm. The ideal angle between the vehicle frame steering head and the control arms is defined by the length of the control arms coupled with the distance one wishes the distal ends of the control arms to swing upward before upper control arm 30 hits the bottom of steering head 105 or lower control arm 40 hits upper control arm 30. With very short control arms of 10-20 cm, the angle may be >90 degrees. With very long control arms of 50-200 cm, the angle may be <30 degrees.

The invention claimed is:

1. A suspension and steering assembly mounted on a frame of a vehicle having a front wheel, said assembly comprising:
   a steering means, said steering means being rotatably mounted on an upper portion of the frame;
   a collapsible steering mechanism comprising:
   an upper link having a top and bottom extremity; and
   a lower link having a top and bottom extremity;

said top extremity of the upper link being hingedly connected to the steering means and the bottom extremity being hingedly connected to the top extremity of the lower link of the collapsible steering mechanism;

said hinged connection between the lower extremity of the upper steering link and the upper extremity of the lower steering link being a rod end and needle bearing assembly;

said upper steering link being able to pitch in relation to the lower steering link by means of the rod end as the links expand and collapse along a vertical axis;

a wheel steering stem having a top and a bottom section, said top section being hingedly connected to the bottom extremity of the lower link of the collapsible steering mechanism and the bottom of said steering stem being connected to a crown of a wheel fork;

a steering tube, said steering tube having an upper and a lower portion;

an upper control arm, said upper control arm having a first and second extremity, said first extremity being pivotally connected to a middle section of the frame, and said second extremity being pivotally connected to the upper portion of the steering tube;

a lower control arm, said lower control arm having a first and second extremity, said first extremity being pivotally connected to a lower section of the frame, and said second extremity being pivotally connected to the lower portion of the steering tube;

said steering stem being mounted inside the steering tube and being rotatable about a longitudinal axis defined by the steering tube; and—and a said wheel fork having a lower section being adapted to receive said front wheel and an upper section connected to the bottom section of the steering stem;

a first damper having a front connection and a rear connection, the front connection being connected to one of said control arms and the rear connection being connected to the vehicle frame;

a second damper having an upper extremity and a lower extremity, said second damper being connected at its upper extremity to the upper link of the collapsible steering mechanism and at its lower extremity to the lower link of the collapsible steering mechanism;

said second damper transmitting an adjustable percentage of suspension energy to the steering means.

2. The suspension and steering assembly of claim 1, wherein the steering means comprises:

a handlebar or a steering wheel having a handlebar stem; and said handlebar stem connected to a vehicle frame steering head.

3. The suspension and steering assembly of claim 2, wherein the collapsible steering mechanism is pivotally linked at the upper extremity of the upper steering link to the handlebar stem and is pivotally linked at the lower extremity of the lower link to the wheel steering stem.

4. The suspension and steering assembly of claim 2, wherein an axis of the handlebar stem and an axis of the wheel steering stem have a misalignment of the axes during movement of the suspension and steering assembly.

5. The suspension and steering assembly of claim 1, wherein the collapsible steering assembly is oriented longitudinally to the front wheel.

6. The suspension and steering assembly of claim 1, wherein the pivotal connections of the upper and lower control arms comprise bearings allowing for pivoting about a horizontal axis.

7. The suspension and steering assembly of claim 1, wherein an arc of the upper control arm intersects an arc of the lower control arm to comprise an arcing path of a front wheel axle.

8. The suspension and steering assembly of claim 1, wherein the suspension and steering assembly is configured to limit the effect of braking forces upon the steering means, control arms, and first damper.

* * * * *